(12) United States Patent
Meassson et al.

(10) Patent No.: US 11,292,128 B2
(45) Date of Patent: Apr. 5, 2022

(54) METHOD FOR PROGRAMMING A FORCE TO BE APPLIED BY A ROBOT

(71) Applicant: COMMISSARIAT A L'ENERGIE ATOMIQUE ET AUX ENERGIES ALTERNATIVES, Paris (FR)

(72) Inventors: Yvan Measson, Palaiseau (FR); Xavier Lamy, Meudon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 591 days.

(21) Appl. No.: 15/775,036

(22) PCT Filed: Nov. 16, 2016

(86) PCT No.: PCT/EP2016/077897
§ 371 (c)(1),
(2) Date: May 10, 2018

(87) PCT Pub. No.: WO2017/089204
PCT Pub. Date: Jun. 1, 2017

(65) Prior Publication Data
US 2018/0354131 A1 Dec. 13, 2018

(30) Foreign Application Priority Data

Nov. 25, 2015 (FR) .................................... 15 61360

(51) Int. Cl.
*B25J 9/16* (2006.01)
*G05B 19/423* (2006.01)

(52) U.S. Cl.
CPC ............. *B25J 9/1664* (2013.01); *B25J 9/163* (2013.01); *B25J 9/1671* (2013.01);
(Continued)

(58) Field of Classification Search
CPC ........ B25J 9/1664; B25J 9/163; B25J 9/1671; B25J 9/0081; G05B 19/423; G05B 2219/36489; G05B 2219/45083
See application file for complete search history.

(56) References Cited

U.S. PATENT DOCUMENTS 5,880,956 A     3/1999 Graf
9,902,059 B2 *  2/2018 Sonoda ...................... B25J 9/16
                 (Continued)

OTHER PUBLICATIONS

International Search Report for PCT/EP2016/077897 dated Jan. 20, 2017 [PCT/ISA/210].

*Primary Examiner* — Jason Holloway
(74) *Attorney, Agent, or Firm* — Sughrue Mion, PLLC

(57) ABSTRACT

Method for programming a force to be applied by a working end of a robot, along at least part of a preprogrammed path of the working end, the method comprising the steps of: —moving the working end of the robot over the said at least part of the preprogrammed path, the driving of the robot being feedback-controlled in order to keep the working end in position without a force setpoint, —at least at one position during the movement, having an operator apply to the working end a force which is the opposite of that which is to be applied during the task and which has an intensity proportionate to that which is to be applied during the task, —determining the force that is to be applied during the task from the resistive force exerted by the robot in order to keep the working end on the path, —storing in memory the force thus determined in relation to the position of the working end while the opposing force is being applied.

14 Claims, 1 Drawing Sheet

(52) U.S. Cl.
CPC .. *G05B 19/423* (2013.01); *G05B 2219/36489* (2013.01); *G05B 2219/45083* (2013.01)

(56) References Cited

U.S. PATENT DOCUMENTS

| | | | | |
|---|---|---|---|---|
| 2010/0152896 | A1* | 6/2010 | Komatsu | B25J 13/085 |
| | | | | 700/258 |
| 2010/0262291 | A1* | 10/2010 | Takesue | B25J 13/025 |
| | | | | 700/260 |
| 2013/0310977 | A1* | 11/2013 | Tsusaka | B25J 9/163 |
| | | | | 700/257 |
| 2015/0081098 | A1* | 3/2015 | Kogan | B25J 9/1656 |
| | | | | 700/258 |
| 2015/0290809 | A1* | 10/2015 | Nakagawa | B25J 9/1676 |
| | | | | 700/258 |
| 2016/0052128 | A1* | 2/2016 | Zimmermann | B25J 9/1628 |
| | | | | 700/261 |
| 2017/0095932 | A1* | 4/2017 | Murakami | B25J 9/1656 |

* cited by examiner

METHOD FOR PROGRAMMING A FORCE TO BE APPLIED BY A ROBOT

CROSS REFERENCE TO RELATED APPLICATIONS

This application is a National Stage of International Application No. PCT/EP2016/077897 filed Nov. 16, 2016, claiming priority based on French Patent Application No. 15 61360 filed Nov. 25, 2015.

The present invention relates to the field of robotics and more particularly, but not exclusively, collaborative robotics.

STATE OF THE ART

The use of robots to perform tasks referred to as "contact" tasks, i.e. tasks during which the robots are in contact with an element in their environment either directly or via a tool or part carried by the robots, is known. These tasks comprise operations of polishing, deburring, assembly, etc.

Such robots generally comprise an arm equipped with motorization connected to a computer control unit which is programmed to control the motorization of the arm in order to move a working end of the robotized arm along a trajectory corresponding to the task to be performed and to cause a force to be exerted at the working end at predetermined points on the trajectory corresponding to the task to be performed.

These robots can therefore simultaneously be position- and force-controlled according to the degrees of freedom specific to the task.

The programming of the trajectory is usually carried out by coding or by teaching. The first method consists in introducing, directly into the program for controlling the motorization of the arm, the instructions for controlling the motorization enabling the working end (commonly called end effector) of the arm to be brought to points defining the desired trajectory. The second method consists in teaching passage points by moving the end of the robot using any console or joystick type control apparatus.

Collaborative robots provide for a method of teaching by demonstration. This involves an operator making the working end move along the desired trajectory while the successive positions of the arm are stored either point by point or in a continuous manner.

The programming of the force that the motorized arm must exert is always carried out by coding and consists in introducing, directly into the program for controlling the motorization of the arm, the motorization control instructions enabling the working end of the arm to exert the desired force at each point defining the desired trajectory.

OBJECT OF THE INVENTION

An aim of the invention is to simplify the programming of robots in respect of force.

SUMMARY OF THE INVENTION

To this end, provision is made, according to the invention, for a method for programming a force to be exerted by a working end of a robot along at least a part of a preprogrammed trajectory of the working end, the method comprising the steps of:

moving the working end of the robot on said at least a part of the preprogrammed trajectory, the motorization of the robot being controlled to maintain the working end in position without a force setting, in at least one position during the movement, an operator causing a force to be exerted on the working end, which force is opposed to that to be applied during the task and which has an intensity proportional to that to be applied during the task, determining the force to be applied during the task from the resistant force exerted by the robot to maintain the working end on the trajectory, storing the force thus determined in association with the position of the working end during the exertion of the opposed force.

The trajectory may have been preprogrammed by any one of the known methods. "Movement of the working end of the robot on the preprogrammed trajectory part" is understood to mean the movement of said working end along this part or on passage points defining this trajectory. The programming of the force to be produced by the working end of the robot is thus performed directly by the operator, exerting on the working end or on an element secured thereto a force corresponding to the force to be produced.

Other features and advantages of the invention will emerge upon reading the following description of particular non-limiting embodiments of the invention.

BRIEF DESCRIPTION OF THE DRAWINGS

Reference will be made to the accompanying drawings, in which.

DETAILED DESCRIPTION OF THE INVENTION

Figure 1:
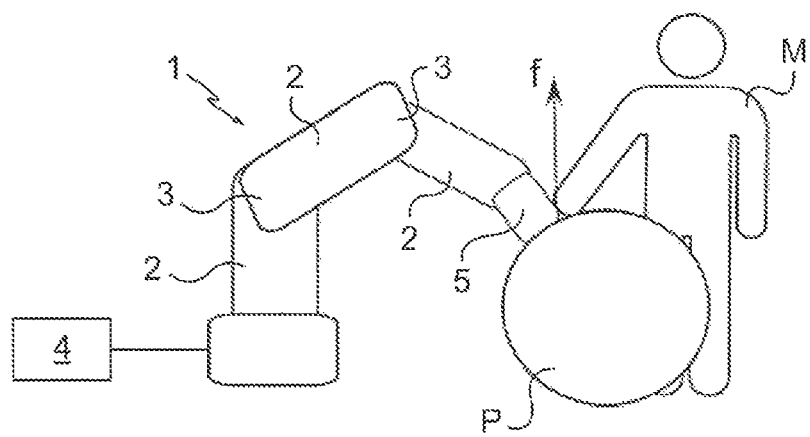
FIG. 1 is a schematic view illustrating the phase of learning of the force by the robot according to the method of the invention.
Figure 2:
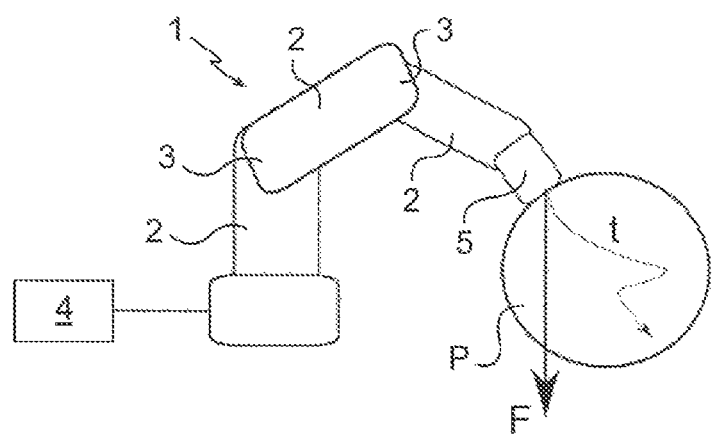
FIG. 2 is a schematic view illustrating the fulfillment of the task by the robot.

With reference to FIGS. 1 and 2, the method of the invention is implemented by means of a robotized arm 1 comprising a plurality of segments 2, including a working end, connected in pairs by at least one hinge 3 provided with a motor connected to a control unit 4 of the robotized arm 1. The control unit 4 is arranged to be able to control the motors of the robotized arm 1. Such a robotized system is known per se and will not be detailed further here.

The task to be performed is in this case the polishing of a part P represented here by a sphere, using a polishing tool 5 moved according to a trajectory t while applying force F.

The programming of the robotized arm is carried out by the execution of a computer program for configuring the robotized arm 1: this program is executed either directly by the control unit 4 or by a computer connected to the control unit 4.

The programming of the robotized arm 1, in order to perform the task in question, comprises the phases of:

programming the trajectory t of the working end corresponding to the task to be performed, programming the force F to be applied by the working end along at least a part of the trajectory t (along the trajectory or at passage points defining the trajectory), checking the programming of the trajectory t and of the force F.

The working end can advantageously be equipped with the tool 5 during the two programming phases and the checking phase. Furthermore, the part P to be polished can advantageously be present.

The phase for programming the trajectory t can advantageously be performed by the operator M causing the working end of the robotized arm 1 to move along the desired trajectory t, or on passage points, and by storing positions of the working end.

The positions can be stored upon command by the operator M or continuously over the entire trajectory t.

In the first case, the user stops the working end of the robotized arm 1 and commands the storing of the position by acting on an input interface, such as a remote control or a button on the robot, connected to the control unit 4 (or, as a variant, to an external control apparatus such as a computer).

In the second case, the operator launches on the control unit 4 a session for programming the trajectory (for example, by pressing a predetermined button on a remote control) and the control unit 4 continuously records the successive positions of the working end until the operator announces the end of the session (for example, by pressing a predetermined button on a remote control).

According to the invention, the phase for programming the force F is performed by the control unit 4 causing the working end of the robotized arm 1 to move along the programmed trajectory t, or on the uniquely learned passage points. During this phase, the motorization of the robotized arm 1 is controlled to maintain the working end in position on the trajectory t without a force setting.

In at least one position during the movement, the operator M exerts on the working end a force f which is opposed to the force F to be applied during the task. The opposed force f is applied by the hand of the operator M which is in direct contact with the working end of the robotized arm 1.

The opposed force f has an intensity proportional to the force F to be applied during the task ($F=-\alpha.f$). In the present case, the force f is of an intensity equal to the force F.

The force F is then determined from the resistant force exerted by the robotized arm 1 to maintain the working end on the trajectory t, or on the passage points.

The resistant force is determined by the control unit 4 from the electrical supply current of the motorization of the robotized arm 1 needed to maintain the working end at the position. As a variant, the resistant force is determined by the control unit from a measurement by a force sensor arranged on the working end.

The force F thus determined is stored in association with the position of the working end during the exertion of the opposed force f.

The determination of the force to be applied and its storing can be carried out:
  either continuously along at least a part of the trajectory,
  or be activated by a command by the operator M (the operator M operates, for example, a button of a remote control when he/she arrives at the position in question and when he/she exerts the opposed force).

The final step, which is recommended but optional, for checking the program consists here in commanding the robotized arm 1 to move the working end along the trajectory t while the operator M is in contact with the working end such that the operator feels the force applied by the robotized arm 1.

Figure 3:
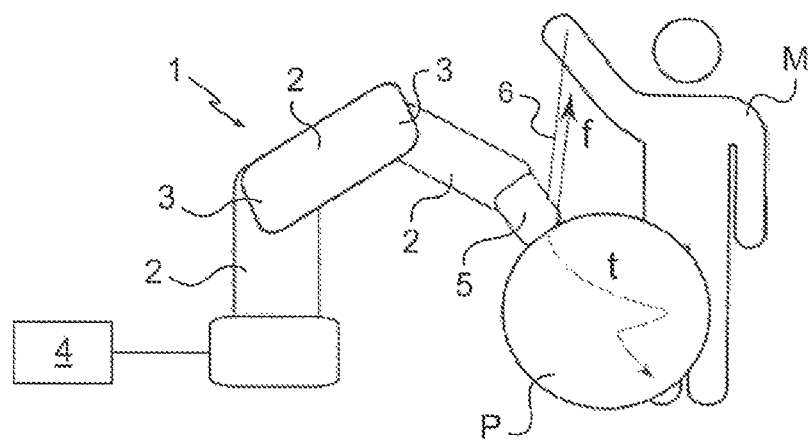
FIG. 3 is a schematic view illustrating the phase of learning of the force by the robot according to a variant implementation of the method of the invention.

In the variant of FIG. 3, the opposed force f is exerted by means of a mechanical link 6, such as a cable or a rod fitted on a ball joint, having one end connected to the working end and an opposite end held by the operator M. This method of exerting the opposed force f is advantageous since the direction of the tension of the mechanical link provides for visualizing the direction of the opposed force f.

In another variant, the opposed force f is exerted by means of an elastic element connected to the working end. The elastic element can be a flexible elastic link or a rigid element connected to the working end by an elastic apparatus such as a dynamometer. This method of exerting the opposed force f is advantageous since, in addition to the direction of the tension of the link, it provides for visualizing the intensity of the opposed force f.

Of course, the invention is not limited to the embodiments described but encompasses any variant entering the field of the invention as defined by the claims.

In particular, although the invention is described in relation to a serial type robotized arm, the invention can be applied to all robot and machine types that can be force-controlled. The invention thus remains applicable to the case of parallel robots, i.e. in the case of more than two segments connected to one another.

The operator can apply the opposed force by means of a handgrip fixed on the working end of the robotized arm 1. The resistant force is then preferably determined from a measurement by a force sensor arranged on the handgrip of the working end of the robotized arm 1.

The invention claimed is:

1. A method for programming for a task a force to be exerted on a surface by a working end of a robot along at least a part of a preprogrammed trajectory of the working end, the method comprising the steps of:
  moving the working end of the robot on said at least a part of the preprogrammed trajectory on the surface, the motorization of the robot being controlled to maintain the working end in position,
  in at least one position during the movement, an operator causing a force to be exerted on the working end, which force is opposed to that to be applied during the task and which has an intensity proportional to that to be applied during the task, the robot maintains the working end on the trajectory by producing a resistant force opposing the force exerted by the operator,
  determining the force to be applied during the task from the resistant force exerted by the robot to maintain the working end on the trajectory,
  storing the force thus determined in association with the position of the working end during the exertion of the opposed force.

2. The method as claimed in claim 1, in which, since the task must be performed using a tool, the working end is equipped with the tool during the movement of the working end along the programmed trajectory.

3. The method as claimed in claim 1, in which the opposed force is exerted by means of a mechanical link connected to the working end or to an element secured thereto.

4. The method as claimed in claim 1, in which the opposed force is exerted by means of an elastic element connected to the working end.

5. The method as claimed in claim 1, in which the determination of the force to be applied, followed by its storing, is activated by an operator command.

6. The method as claimed in claim 1, in which the determination of the force to be applied and its storing are carried out continuously along at least a part of the trajectory.

7. The method as claimed in claim 1, in which the resistant force is determined by measuring an electrical supply current of the motorization of the robot arm.

8. The method as claimed in claim 1, in which the resistant force is determined from a measurement by a force sensor arranged on the working end or an element secured thereto.

9. The method as claimed in claim 1, in which the resistant force is determined from a measurement by a force sensor arranged on a handgrip of the working end or an element secured thereto, by the operator.

10. The method as claimed in claim 1, comprising a final step to check the programming, during which the robot arm is commanded to move along said at least a part of the trajectory while the operator is in contact with the working end such that the operator feels the force applied by the robot arm.

11. A robot having a computer control unit programmed to implement the method as claimed in claim 1.

12. The method as claimed in claim 1, wherein during the step of moving the working end of the robot on said at least a part of the preprogrammed trajectory on the surface, the motorization of the robot is controlled to maintain the working end in position without applying a predetermined force for carrying out the task.

13. A method for control of a robot for performing a task during which a working end of the robot exerts a force on a surface along at least a part of a preprogrammed trajectory of the working end, the method comprising the steps of:

during a programming phase preceding the task carrying out the following steps:
moving the working end of the robot on said at least a part of the preprogrammed trajectory, the motorization of the robot controlled to maintain the working end in position,
in at least one position during the movement, an operator causing a force to be exerted on the working end, which force is opposed to that to be applied during the task and which has an intensity proportional to that to be applied during the task,
determining the force to be applied during the task from the resistant force exerted by the robot to maintain the working end on the trajectory, and
storing in a control program of the robot the force thus determined in association with the position of the working end during the exertion of the opposed force; and during performance of the task carrying out the following step:
executing the control program of the robot so that the robot moves the working end along the preprogrammed trajectory and exerts the stored force on the surface.

14. The method as claimed in claim 13, wherein during the step of moving the working end of the robot on said at least a part of the preprogrammed trajectory, the motorization of the robot is controlled to maintain the working end in position without applying a predetermined force for carrying out the task.

* * * * *